United States Patent
Li et al.

(10) Patent No.: US 10,419,531 B2
(45) Date of Patent: Sep. 17, 2019

(54) METHOD FOR SETTING GATEWAY DEVICE IDENTITY, AND MANAGEMENT GATEWAY DEVICE

(71) Applicant: Huawei Technologies Co., Ltd., Shenzhen, Guangdong (CN)

(72) Inventors: Wenhui Li, Nanjing (CN); Wei Chen, Nanjing (CN); Hui Ni, Shenzhen (CN); Hua Li, Nanjing (CN); Zeyu Sun, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 968 days.

(21) Appl. No.: 14/948,829

(22) Filed: Nov. 23, 2015

(65) Prior Publication Data

US 2016/0080483 A1 Mar. 17, 2016

Related U.S. Application Data

(63) Continuation of application No. PCT/CN2014/072851, filed on Mar. 4, 2014.

(30) Foreign Application Priority Data

May 29, 2013 (CN) .......................... 2013 1 0204579

(51) Int. Cl.
*G06F 15/173* (2006.01)
*H04L 29/08* (2006.01)
(Continued)

(52) U.S. Cl.
CPC ...... *H04L 67/1008* (2013.01); *H04L 12/6418* (2013.01); *H04L 12/66* (2013.01);
(Continued)

(58) Field of Classification Search
CPC ............. H04L 67/1008; H04L 47/2466; H04L 61/103; H04L 47/125; H04L 12/66; H04L 12/6418

See application file for complete search history.

(56) References Cited

U.S. PATENT DOCUMENTS 6,751,191 B1 6/2004 Kanekar et al.
7,881,208 B1 * 2/2011 Nosella ............. H04L 29/12028
370/220

(Continued)

FOREIGN PATENT DOCUMENTS

CN 1533108 A 9/2004
CN 100407671 C 7/2008
(Continued)

*Primary Examiner* — Suraj M Joshi
*Assistant Examiner* — Jaren Means
(74) *Attorney, Agent, or Firm* — Womble Bond Dickinson (US) LLP

(57) ABSTRACT

Embodiments of the present application disclose a method for setting a gateway device identity, and a management gateway device. The method includes: acquiring a negotiation packet of a gateway device; acquiring a gateway device priority carried in the negotiation packet; and setting a member identity of the gateway device according to the gateway device priority. According to the method and the device, complexity of selecting an active virtual gateway device or an active virtual forwarding device among multiple gateway devices can be reduced, and the processing efficiency of a service mechanism of traffic load sharing of multiple gateway devices can be enhanced.

8 Claims, 8 Drawing Sheets

(51) Int. Cl.
  *H04L 12/64*    (2006.01)
  *H04L 12/66*    (2006.01)
  *H04L 12/803*   (2013.01)
  *H04L 12/855*   (2013.01)
  *H04L 29/12*    (2006.01)

(52) U.S. Cl.
  CPC ........ *H04L 47/125* (2013.01); *H04L 47/2466* (2013.01); *H04L 61/103* (2013.01)

(56) References Cited

U.S. PATENT DOCUMENTS

| | | |
|---|---|---|
| 2003/0183878 A1 | 10/2003 | Masayuki et al. |
| 2009/0016215 A1 | 1/2009 | Nadas et al. |
| 2011/0292933 A1 | 12/2011 | Rodriguez et al. |
| 2013/0007183 A1 | 1/2013 | Sorenson, III et al. |
| 2014/0047098 A1* | 2/2014 | Rajah .................... H04L 45/586 709/224 |
| 2014/0188795 A1* | 7/2014 | Alewine ............. G06F 11/1662 707/615 |

FOREIGN PATENT DOCUMENTS

| | | |
|---|---|---|
| CN | 101217402 A | 7/2008 |
| CN | 101404621 A | 4/2009 |
| CN | 101815007 A | 8/2010 |
| CN | 102209064 A | 10/2011 |
| CN | 102315970 A | 1/2012 |
| CN | 102447615 A | 5/2012 |
| CN | 103312605 A | 9/2013 |

* cited by examiner

METHOD FOR SETTING GATEWAY DEVICE IDENTITY, AND MANAGEMENT GATEWAY DEVICE

CROSS-REFERENCE TO RELATED APPLICATIONS

This application is a continuation of International Application No. PCT/CN2014/072851, filed on Mar. 4, 2014, which claims priority to Chinese Patent Application No. 201310204579.9, filed on May 29, 2013, 2013, both of which are hereby incorporated by reference in their entireties.

TECHNICAL FIELD

The present application relates to the field of computer networks, and in particular, to a method for setting a gateway device identity, and a management gateway device.

BACKGROUND

With the continuous development of computer technologies, a network has become an indispensable application for people in everyday life, and with the continuous popularity of computer network technologies, traffic load in the network is ever-increasing, which aggravates workload of a virtual gateway device.

Existing multiple gateway devices implement traffic load sharing of multiple gateway devices by using a multi-gateway load sharing protocol. Multiple gateway devices need to negotiate, by using a protocol, an active virtual gateway device that is responsible for replying to an ARP (Address Resolution Protocol) request of a client and allocating a different virtual MAC (Medium/Media Access Control) address for the client, and the rest sharing gateway devices serve as active virtual forwarding devices responsible for managing a client allocated by the active virtual gateway device. When one active virtual forwarding device encounters a fault, negotiation also needs to be performed by using a protocol to select one active virtual forwarding device from the rest active virtual forwarding devices to replace the active virtual forwarding device encountering the fault and manage a client of the active virtual forwarding device encountering the fault.

In an implementation process, negotiation always needs to be performed by using a protocol, which increases complexity of a selection process, and lowers the processing efficiency of a service mechanism, so that a process of implementing traffic load sharing of multiple gateway devices is not intelligent enough.

SUMMARY

Embodiments of the present application aim to provide a method for setting a gateway device identity, and a management gateway device.

To solve the foregoing technical problem, a first aspect of the present application provides a method for setting a gateway device identity, which may include:
acquiring a negotiation packet of a gateway device;
acquiring a gateway device priority carried in the negotiation packet; and
setting a member identity of the gateway device according to the gateway device priority.

Based on the first aspect, in a first feasible implementation manner of the first aspect, before the acquiring a negotiation packet of a gateway device, the method further includes:
setting a load sharing gateway device group in a virtual cluster, and acquiring device information and resource information that are included in the load sharing gateway device group, where the device information includes client information and gateway device information, the resource information includes multiple virtual MAC addresses of the load sharing gateway device group, and
the gateway device is a gateway device in the load sharing gateway device group.

Based on the first feasible implementation manner of the first aspect, in a second feasible implementation manner of the first aspect, the acquiring a negotiation packet of a gateway device may include:
if it is detected that a gateway device joins the load sharing gateway device group, acquiring a negotiation packet of the gateway device that joins the load sharing gateway device group.

Based on the second feasible implementation manner of the first aspect, in a third feasible implementation manner of the first aspect, the setting a member identity of the gateway device according to the gateway device priority may include:
if the gateway device priority of the gateway device is less than a gateway device priority of a management gateway device, setting the member identity of the gateway device to an active virtual forwarding device; and
if the gateway device priority of the gateway device is greater than the gateway device priority of the management gateway device, setting the member identity of the gateway device to an active virtual gateway device.

Based on the first aspect or the first feasible implementation manner of the first aspect, in a fourth feasible implementation manner of the first aspect, the acquiring a negotiation packet of a gateway device may include:
if a current member identity of a management gateway device is an active virtual gateway device, and when a fault occurs on the management gateway device, acquiring the negotiation packet of the gateway device.

Based on the fourth feasible implementation manner of the first aspect, in a fifth feasible implementation manner of the first aspect, the setting a member identity of the gateway device according to the gateway device priority may include:
setting a member identity of a gateway device with a highest gateway device priority to an active virtual gateway device.

Based on the first aspect or the first feasible implementation manner of the first aspect, in a sixth feasible implementation manner of the first aspect, the acquiring a negotiation packet of a gateway device may include:
if a current member identity of a management gateway device is an active virtual gateway device, and when any gateway device with a member identity being an active virtual forwarding device encounters a fault, acquiring negotiation packets of other gateway devices with the member identity being an active virtual forwarding device.

Based on the sixth feasible implementation manner of the first aspect, in a seventh feasible implementation manner of the first aspect, the setting a member identity of the gateway device according to the gateway device priority may include:
setting, among the gateway devices with the member identity being an active virtual forwarding device, a gateway device with a highest gateway device priority to replace the gateway device encountering the fault.

Based on the first feasible implementation manner of the first aspect, in an eighth feasible implementation manner of the first aspect, the method further includes:

if the member identity of the gateway device is an active virtual gateway device, sending the device information and the resource information to the gateway device.

Based on the first feasible implementation manner of the first aspect, in a ninth feasible implementation manner of the first aspect, the method further includes:

if the member identity of the gateway device is an active virtual forwarding device, allocating a virtual MAC address from the resource information to the gateway device, and allocating the virtual MAC address to at least one client according to the device information.

A second aspect of the present application provides a management gateway device, which may include a packet acquiring module, a priority acquiring module, and an identity setting module, where:

the packet acquiring module is configured to acquire a negotiation packet of a gateway device;

the priority acquiring module is configured to acquire a gateway device priority carried in the negotiation packet; and the identity setting module is configured to set a member identity of the gateway device according to the gateway device priority.

Based on the second aspect, in a first feasible implementation manner of the second aspect, the device further includes a gateway group setting module:

the gateway group setting module is configured to set a load sharing gateway device group in a virtual cluster, and acquire device information and resource information that are included in the load sharing gateway device group, where the device information includes client information and gateway device information, the resource information includes multiple virtual Medium Access Control MAC addresses of the load sharing gateway device group, and the gateway device is a gateway device in the load sharing gateway device group.

Based on the first feasible implementation manner of the second aspect, in a second feasible implementation manner of the second aspect, the packet acquiring module includes a first acquiring unit, where:

the first acquiring unit is configured to: if it is detected that a gateway device joins the load sharing gateway device group, acquire a negotiation packet of the gateway device that joins the load sharing gateway device group.

Based on the second feasible implementation manner of the second aspect, in a third feasible implementation manner of the second aspect, the identity setting module includes a first setting unit, where:

the first setting unit is configured to set the member identity of the gateway device to an active virtual forwarding device if the gateway device priority of the gateway device that joins the load sharing gateway device group is less than a gateway device priority of the management gateway device; and the first setting unit is further configured to set the member identity of the gateway device to an active virtual gateway device if the gateway device priority of the gateway device that joins the load sharing gateway device group is greater than the gateway device priority of the management gateway device.

Based on the second aspect or the first feasible implementation manner of the second aspect, in a fourth feasible implementation manner of the second aspect, the packet acquiring module further includes a second acquiring unit, where:

the second acquiring unit is configured to acquire the negotiation packet of the gateway device if a current member identity of the management gateway device is an active virtual gateway device and when a fault occurs on the management gateway device.

Based on the fourth feasible implementation manner of the second aspect, in a fifth feasible implementation manner of the second aspect, the identity setting module further includes a second setting unit, where:

the second setting unit is configured to set a member identity of a gateway device with a highest gateway device priority to an active virtual gateway device.

Based on the second aspect or the first feasible implementation manner of the second aspect, in a sixth feasible implementation manner of the second aspect, the packet acquiring module further includes a third acquiring unit, where:

the third acquiring unit is configured to: if a current member identity of the management gateway device is an active virtual gateway device and when any gateway device with a member identity being an active virtual forwarding device encounters a fault, acquire negotiation packets of other gateway devices with the member identity being an active virtual forwarding device.

Based on the sixth feasible implementation manner of the second aspect, in a seventh feasible implementation manner of the second aspect, the identity setting module further includes a third setting unit, where:

the third setting unit is configured to set, among the gateway devices with the member identity being an active virtual forwarding device, a gateway device with a highest gateway device priority to replace the gateway device encountering the fault.

Based on the first feasible implementation manner of the second aspect, in an eighth feasible implementation manner of the second aspect, the device further includes an information sending module, where:

the information sending module is configured to: if a member identity of the gateway device is an active virtual gateway device, send the device information and the resource information to the gateway device.

Based on the first feasible implementation manner of the second aspect, in a ninth feasible implementation manner of the second aspect, the device further includes an address allocating module, where:

the address allocating module is configured to: if the member identity of the gateway device is an active virtual forwarding device, allocate a virtual MAC address from the resource information to the gateway device, and allocate the virtual MAC address to at least one client according to the device information.

Some feasible implementation manners of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding. A member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances the processing efficiency of a service mechanism, so that a process of implementing traffic load sharing of multiple gateway devices is more intelligent.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

In the embodiments of the present application, during initial setup of multi-gateway traffic load sharing, optionally, a user selects a gateway device in a virtual cluster as a device (hereinafter referred to as a management gateway device) that sets identities of other gateway devices, and sets a member identity of the management gateway device to an active virtual gateway device. The embodiments of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

Figure 1:
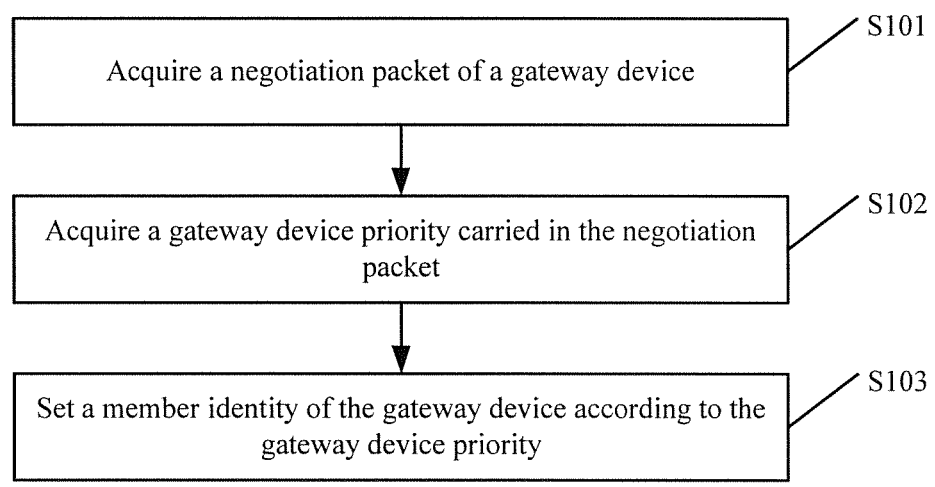
FIG. 1 is a schematic flowchart of a method for setting a gateway device identity according to an embodiment of the present application.

Referring to FIG. 1, a method for setting a gateway device identity provided by an embodiment of the present application includes:

S101: Acquire a negotiation packet of a gateway device.

Specifically, the negotiation packet includes a gateway device priority of the gateway device, where the gateway device priority may be a priority parameter that is set by a user according to a performance index of the gateway device. In the following three cases, a negotiation packet of a gateway device needs to be acquired:

1. When there is a gateway device, in a virtual cluster, that needs to perform multi-gateway traffic load sharing with the management gateway device, the management gateway device acquires a negotiation packet of the gateway device.

2. When the management gateway device encounters a fault, the management gateway device acquires negotiation packets of gateway devices with a member identity being an active virtual forwarding device among multiple gateway devices of multi-gateway traffic load sharing.

3. When any gateway device with a member identity being an active virtual forwarding device among multiple gateway devices of multi-gateway traffic load sharing encounters a fault, the management gateway device acquires negotiation packets of other gateway devices with a member identity being an active virtual forwarding device.

It should be noted that, when there is a gateway device, in the virtual cluster, that needs to perform multi-gateway traffic load sharing with the management gateway device, the gateway device that performs multi-gateway traffic load sharing with the management gateway device sends a negotiation packet to the management gateway device, to request to join a load sharing gateway device group.

If a gateway device with a member identity being an active virtual forwarding device already exists in the gateway devices of multi-gateway traffic load sharing, when the management gateway device encounters a fault, the management gateway device requests a negotiation packet from the gateway device with the member identity being an active virtual forwarding device.

If gateway devices with a member identity being an active virtual forwarding device already exist in the gateway devices of multi-gateway traffic load sharing, when any gateway device with a member identity being an active virtual forwarding device among the multiple gateway devices of multi-gateway traffic load sharing encounters a fault, the management gateway device requests a negotiation packet from another gateway device with a member identity being an active virtual forwarding device.

S102: Acquire a gateway device priority carried in the negotiation packet.

Specifically, the gateway device priority of the gateway device is acquired from the negotiation packet.

S103: Set a member identity of the gateway device according to the gateway device priority.

Specifically, the member identity includes an active virtual gateway device and an active virtual forwarding device. A specific setting manner of setting the member identity of the gateway device according to the acquired gateway device priority in the negotiation packet of the gateway device may be as follows:

1. When there is a gateway device, in the virtual cluster, that needs to perform multi-gateway traffic load sharing with the management gateway device, if an acquired gateway device priority of the gateway device that performs multi-gateway traffic load sharing with the management gateway device is less than a gateway device priority of the management gateway device, the management gateway device sets a member identity of the gateway device that performs multi-gateway traffic load sharing with the management gateway device to an active virtual forwarding device, and if the acquired gateway device priority of the gateway device that performs multi-gateway traffic load sharing with the management gateway device is greater than the gateway device priority of the management gateway device, the management gateway device sets the member identity of the gateway device that performs multi-gateway traffic load sharing with the management gateway device to an active virtual gateway device.

It should be noted that, if the gateway device priority of the management gateway device is the same as the gateway device priority of the gateway device that performs multi-gateway traffic load sharing with the management gateway device, optionally, values of system MAC addresses is compared: if a system MAC address of the management gateway device is greater than a system MAC address of the gateway device that performs multi-gateway traffic load sharing with the management gateway device, the management gateway device sets the member identity of the gateway device that performs multi-gateway traffic load sharing with the management gateway device to an active virtual forwarding device; and if the system MAC address of the management gateway device is less than the system MAC address of the gateway device that performs multi-gateway traffic load sharing with the management gateway device, the management gateway device sets the member identity of the gateway device that performs multi-gateway traffic load sharing with the management gateway device to an active virtual gateway device.

2. If gateway devices with a member identity being an active virtual forwarding device already exist in the gateway devices of multi-gateway traffic load sharing, when the management gateway device encounters a fault, the management gateway device sets a member identity of a gateway device with a highest gateway device priority to an active virtual gateway device according to acquired gateway device priorities of all gateway devices in the gateway devices of multi-gateway traffic load sharing.

3. If gateway devices with a member identity being an active virtual forwarding device already exist in the gateway devices of multi-gateway traffic load sharing, when any gateway device with a member identity being an active virtual forwarding device among the multiple gateway devices of multi-gateway traffic load sharing encounters a fault, the management gateway device sets, according to acquired gateway device priorities of the rest gateway devices with a member identity being an active virtual forwarding device in the gateway devices of multi-gateway traffic load sharing, a gateway device with a highest gateway device priority to replace the gateway device encountering the fault, and in this case, a member identity of the gateway device with the highest gateway device priority is still an active virtual forwarding device.

The user may further set one gateway device in the virtual cluster to replace the gateway device encountering the fault, and the management gateway device sets the gateway device, which is set by the user in the virtual cluster, to an active virtual forwarding device.

According to the foregoing three cases, the management gateway device sends the member identity of the gateway device to the gateway device by using a VRRP (Virtual Router Redundancy Protocol) packet.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances the processing efficiency of a service mechanism, so that a process of implementing traffic load sharing of multiple gateway devices is more intelligent.

Figure 2:
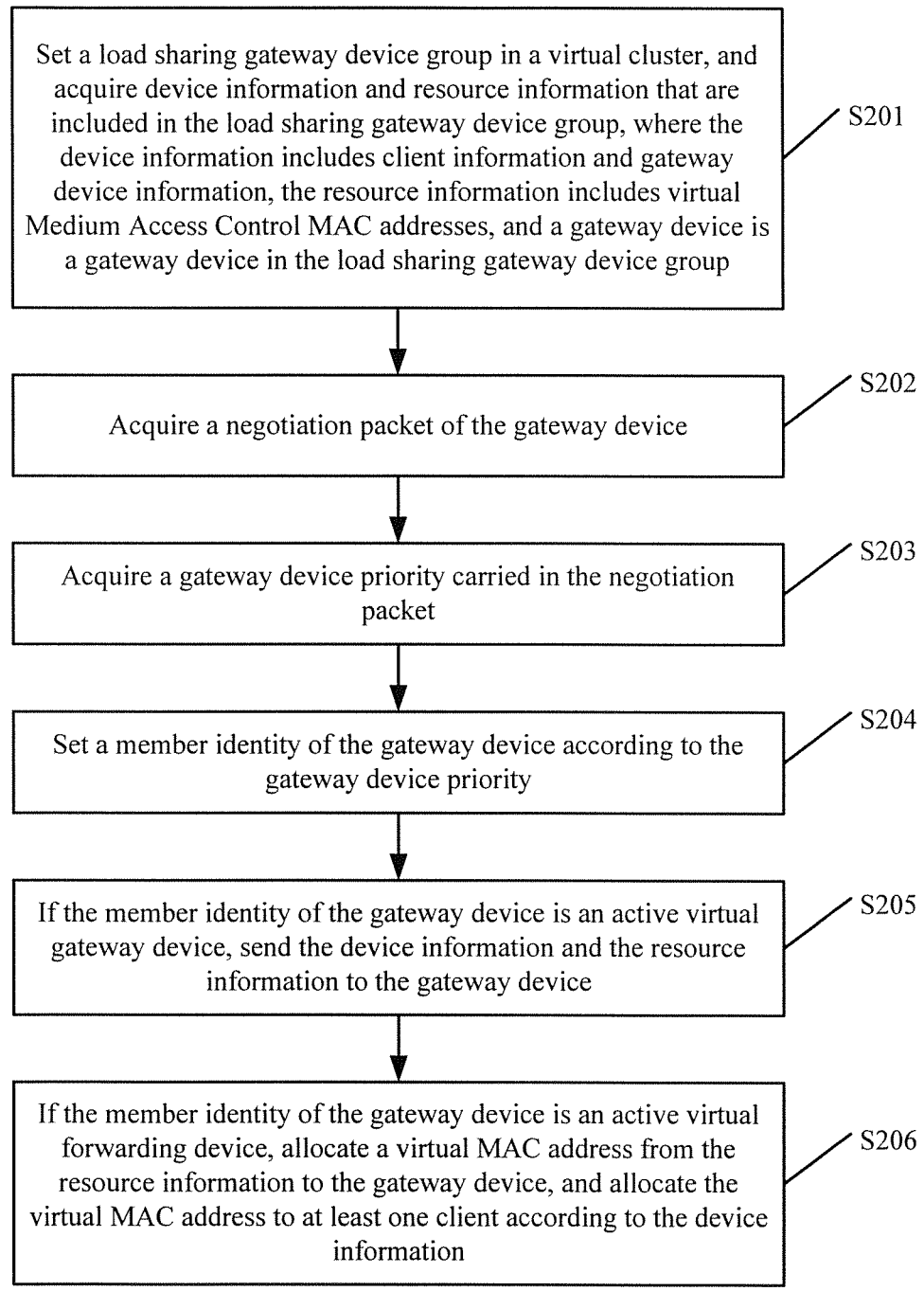
FIG. 2 is a schematic flowchart of another method for setting a gateway device identity according to an embodiment of the present application.

Referring to FIG. 2, another method for setting a gateway device identity in an embodiment of the present application includes:

S201: Set a load sharing gateway device group in a virtual cluster, and acquire device information and resource information of the load sharing gateway device group, where the device information includes client information and gateway device information, the resource information includes virtual MAC addresses, and a gateway device is a gateway device in the load sharing gateway device group.

Specifically, when a management gateway device sets the load sharing gateway device group in the virtual cluster, the management gateway device serves as an active virtual gateway device of the load sharing gateway device group, sets a unique identifier for the load sharing gateway device group, and acquires the device information and the resource information that are included in the load sharing gateway device group, where the device information includes the client information and gateway device information of the load sharing gateway device group, and the resource information includes multiple virtual MAC addresses of the load sharing gateway device group.

It should be noted that, a user may set the identifier for some gateway devices in the virtual cluster, and the gateway devices may find the load sharing gateway device group by using the identifier, and send a negotiation packet to the management gateway device in the load sharing gateway device group, so as to request to join the load sharing gateway device group.

If a gateway device with a member identity being an active virtual forwarding device already exists in the load sharing gateway device group, when the management gateway device encounters a fault, the management gateway device requests a negotiation packet from the gateway device with the member identity being an active virtual forwarding device.

If gateway devices with a member identity being an active virtual forwarding device already exist in the load sharing gateway device group, when any gateway device with a member identity being an active virtual forwarding device in the load sharing gateway device group encounters a fault, the management gateway device requests a negotiation packet from another gateway device with a member identity being an active virtual forwarding device.

Both the management gateway device and the gateway device are gateway devices in the load sharing gateway device group.

S202: Acquire a negotiation packet of the gateway device.

Specifically, the negotiation packet includes a gateway device priority of the gateway device, where the gateway device priority may be a priority parameter that is set by the user according to a performance index of the gateway device. In the following three cases, a negotiation packet of a gateway device needs to be acquired:

1. When there is a gateway device, in the virtual cluster, that needs to join the load sharing gateway device group, the management gateway device acquires a negotiation packet of the gateway device that needs to join the load sharing gateway device group.

2. When the management gateway device encounters a fault, acquire a negotiation packet of a gateway device with a member identity being an active virtual forwarding device in the load sharing gateway device group.

3. When any gateway device with a member identity being an active virtual forwarding device in the load sharing gateway device group encounters a fault, the management gateway device acquires negotiation packets of other gateway devices with a member identity being an active virtual forwarding device.

S203: Acquire a gateway device priority carried in the negotiation packet.

Specifically, the gateway device priority of the gateway device is acquired from the negotiation packet.

S204: Set a member identity of the gateway device according to the gateway device priority.

Specifically, if there is a gateway device that joins the load sharing gateway device group, the management gateway device determines whether a gateway device priority of the gateway device that joins the load sharing gateway device group is less than its own gateway device priority; if yes, sets a member identity of the gateway device that joins the load sharing gateway device group to an active virtual forwarding device; and if not, sets the member identity of the gateway device that joins the load sharing gateway device group to an active virtual gateway device.

It should be noted that, if the gateway device priority of the management gateway device is the same as the gateway device priority of the gateway device that joins the load sharing gateway device group, optionally, values of system MAC addresses are compared: if a system MAC address of the management gateway device is greater than a system MAC address of the gateway device that joins the load sharing gateway device group, the management gateway device sets the member identity of the gateway device that joins the load sharing gateway device group to an active virtual forwarding device, and if the system MAC address of the management gateway device is less than the system MAC address of the gateway device that joins the load sharing gateway device group, the management gateway device sets the member identity of the gateway device that joins the load sharing gateway device group to an active virtual gateway device.

If the management gateway device encounters a fault, the management gateway device sets a member identity of a gateway device with a highest gateway device priority to an active virtual gateway device, and the gateway device becomes a management gateway device.

If any gateway device with a member identity being an active virtual forwarding device in the load sharing gateway device group encounters a fault, the management gateway device sets, among the gateway devices with a member identity being an active virtual forwarding device, a gateway device with a highest gateway device priority to replace the gateway device encountering the fault.

S205: If the member identity of the gateway device is an active virtual gateway device, send the device information and the resource information to the gateway device, so that the gateway device allocates a virtual MAC address to at least one client according to the device information and the resource information, and finally the client searches, according to the virtual MAC address, for a corresponding gateway device to serve as a service gateway.

Specifically, if the management gateway device sets the member identity of the gateway device to an active virtual gateway device, the device information and resource information of the load sharing gateway device group are sent to the gateway device.

The gateway device allocates a virtual MAC address to at least one client according to the device information and the resource information, and delivers its own virtual MAC address to a client group by using a VRRP packet, so that a client that has the virtual MAC address in the client group finds the gateway device to serve as a service gateway.

S206: If a member identity of the gateway device is an active virtual forwarding device, allocate a virtual MAC address from the resource information to the gateway device, and allocate the virtual MAC address to at least one client according to the device information, so that the client searches, according to the virtual MAC address, for the gateway device to serve as a service gateway.

Specifically, if the management gateway device sets the member identity of the gateway device to an active virtual forwarding device, the management gateway device allocates one virtual MAC address from the resource information in the load sharing gateway device group to the gateway device, and allocates the virtual MAC address to at least one client according to the device information.

The gateway device delivers its own virtual MAC address to a client group by using a VRRP packet, so that a client that has the virtual MAC address in the client group finds the gateway device to serve as a service gateway.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a load sharing gateway device group is set under an architecture of a virtual cluster, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances flexibility of fault processing; in addition, the gateway device delivers its own virtual MAC address, so as to provide the virtual MAC address for a client to select a corresponding gateway device to serve as a service gateway, which implements separation between a function of setting a member identity and a function of delivering a virtual MAC address, and enhances the processing efficiency of a service mechanism, so that a process of implementing traffic load sharing of multiple gateway devices is more intelligent.

Figure 3:
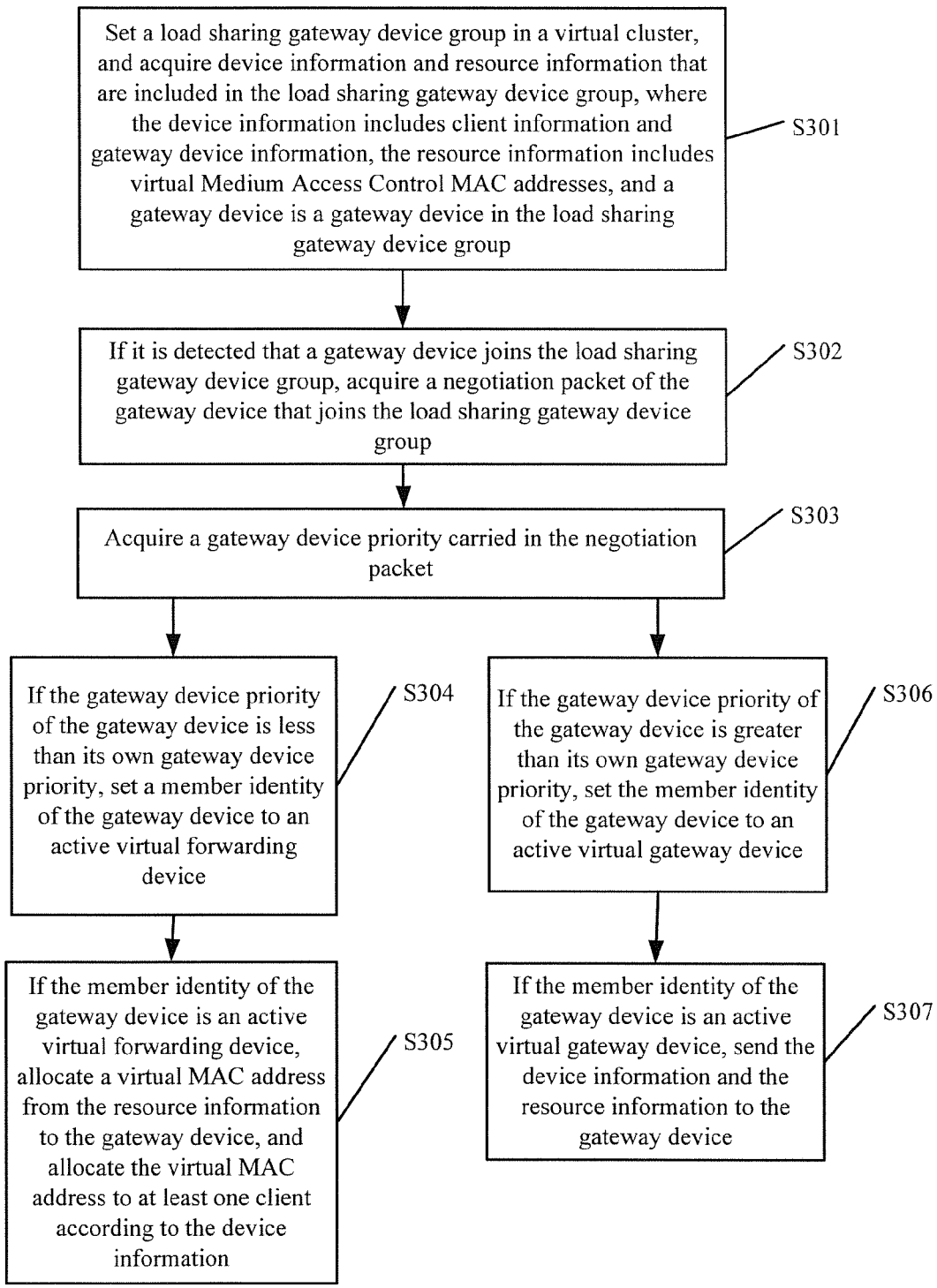
FIG. 3 is a schematic flowchart of still another method for setting a gateway device identity according to an embodiment of the present application.

Referring to FIG. 3, FIG. 3 is a schematic flowchart of still another method for setting a gateway device identity according to an embodiment of the present application. As shown in FIG. 3, the method in this embodiment of the present application is specifically applied to a scenario in which a new gateway device in a virtual cluster joins a load sharing gateway device group, and the method includes:

S301: Set a load sharing gateway device group in a virtual cluster, and acquire device information and resource information that are included in the load sharing gateway device group, where the device information includes client information and gateway device information, and the resource information includes virtual MAC addresses.

Specifically, when a management gateway device sets the load sharing gateway device group in the virtual cluster, the management gateway device serves as an active virtual gateway device of the load sharing gateway device group, sets a unique identifier for the load sharing gateway device group, and acquires the device information and the resource information that are included in the load sharing gateway device group, where the device information includes the client information and gateway device information of the load sharing gateway device group, and the resource information includes multiple virtual MAC addresses of the load sharing gateway device group.

A user may set the identifier for some gateway devices in the virtual cluster, and the gateway devices may find the load sharing gateway device group by using the identifier, and send a negotiation packet to the management gateway device in the load sharing gateway device group, so as to request to join the load sharing gateway device group.

S302: If it is detected that a gateway device joins the load sharing gateway device group, acquire a negotiation packet of the gateway device that joins the load sharing gateway device group.

Specifically, if it is detected that a gateway device in the virtual cluster joins the load sharing gateway device group to perform multi-gateway traffic load sharing, the negotiation packet of the gateway device that joins the load sharing gateway device group is acquired.

The negotiation packet includes a gateway device priority of the gateway device that joins the load sharing gateway device group, where the gateway device priority may be a priority parameter that is set by the user according to a performance index of the gateway device that joins the load sharing gateway device group.

S303: Acquire a gateway device priority carried in the negotiation packet.

Specifically, the gateway device priority of the gateway device that joins the load sharing gateway device group is acquired from the negotiation packet.

S304: If the gateway device priority of the gateway device that joins the load sharing gateway device group is less than its own gateway device priority, set a member identity of the gateway device that joins the load sharing gateway device group to an active virtual forwarding device.

Specifically, if the management gateway device determines that the gateway device priority of the gateway device that joins the load sharing gateway device group is less than its own gateway device priority, the member identity of the gateway device that joins the load sharing gateway device group is set to an active virtual forwarding device.

It should be noted that, if the gateway device priority of the management gateway device is the same as the gateway device priority of the gateway device that joins the load sharing gateway device group, optionally, values of system MAC addresses are compared: if a system MAC address of the management gateway device is greater than a system MAC address of the gateway device that joins the load sharing gateway device group, the management gateway device sets the member identity of the gateway device that joins the load sharing gateway device group to an active virtual forwarding device, and if the system MAC address of the management gateway device is less than the system MAC address of the gateway device that joins the load sharing gateway device group, the management gateway device sets the member identity of the gateway device that joins the load sharing gateway device group to an active virtual gateway device.

S305: If the member identity of the gateway device that joins the load sharing gateway device group is an active virtual forwarding device, allocate a virtual MAC address from the resource information to the gateway device that joins the load sharing gateway device group, and allocate the virtual MAC address to at least one client according to the device information, so that the client searches, according to the virtual MAC address, for the gateway device that joins the load sharing gateway device group to serve as a service gateway.

Specifically, if the management gateway device sets the member identity of the gateway device that joins the load sharing gateway device group to an active virtual forwarding device, the management gateway device allocates one virtual MAC address from the resource information in the load sharing gateway device group to the gateway device that joins the load sharing gateway device group, and allocates the virtual MAC address to at least one client according to the device information.

The gateway device that joins the load sharing gateway device group delivers its own virtual MAC address to a client group by using a VRRP packet, so that a client that has the virtual MAC address in the client group finds the gateway device that joins the load sharing gateway device group to serve as a service gateway.

S306: If the gateway device priority of the gateway device that joins the load sharing gateway device group is greater than its own gateway device priority, set the member identity of the gateway device that joins the load sharing gateway device group to an active virtual gateway device.

Specifically, if the management gateway device determines that the gateway device priority of the gateway device that joins the load sharing gateway device group is greater than its own gateway device priority, the member identity of the gateway device that joins the load sharing gateway device group is set to an active virtual gateway device.

S307: If the member identity of the gateway device that joins the load sharing gateway device group is an active virtual gateway device, send the device information and the resource information to the gateway device, so that the gateway device that joins the load sharing gateway device group allocates a virtual MAC address to at least one client according to the device information and the resource information, and finally the client searches, according to the virtual MAC address, for the corresponding gateway device that joins the load sharing gateway device group to serve as a service gateway.

Specifically, if the management gateway device sets the member identity of the gateway device that joins the load sharing gateway device group to an active virtual gateway device, the device information and the resource information in the load sharing gateway device group are sent to the gateway device, and in this case, the gateway device that joins the load sharing gateway device group becomes a management gateway device.

After the gateway device that joins the load sharing gateway device group becomes the management gateway device, the gateway device that joins the load sharing gateway device group allocates a virtual MAC address to at least one client according to the device information and the resource information, and delivers its own virtual MAC address to a client group by using a VRRP packet, so that a client that has the virtual MAC address in the client group finds the gateway device that joins the load sharing gateway device group to serve as a service gateway.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a load sharing gateway device group is set under an architecture of a virtual cluster, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances flexibility of fault processing; in addition, the gateway device delivers its own virtual MAC address, so as to provide the virtual MAC address for a client to select a corresponding gateway device to serve as a service gateway, which implements separation between a function of setting a member identity and a function of delivering a virtual MAC address, and enhances the processing efficiency of a service mechanism, so that a process of implementing traffic load sharing of multiple gateway devices is more intelligent.

Figure 4:
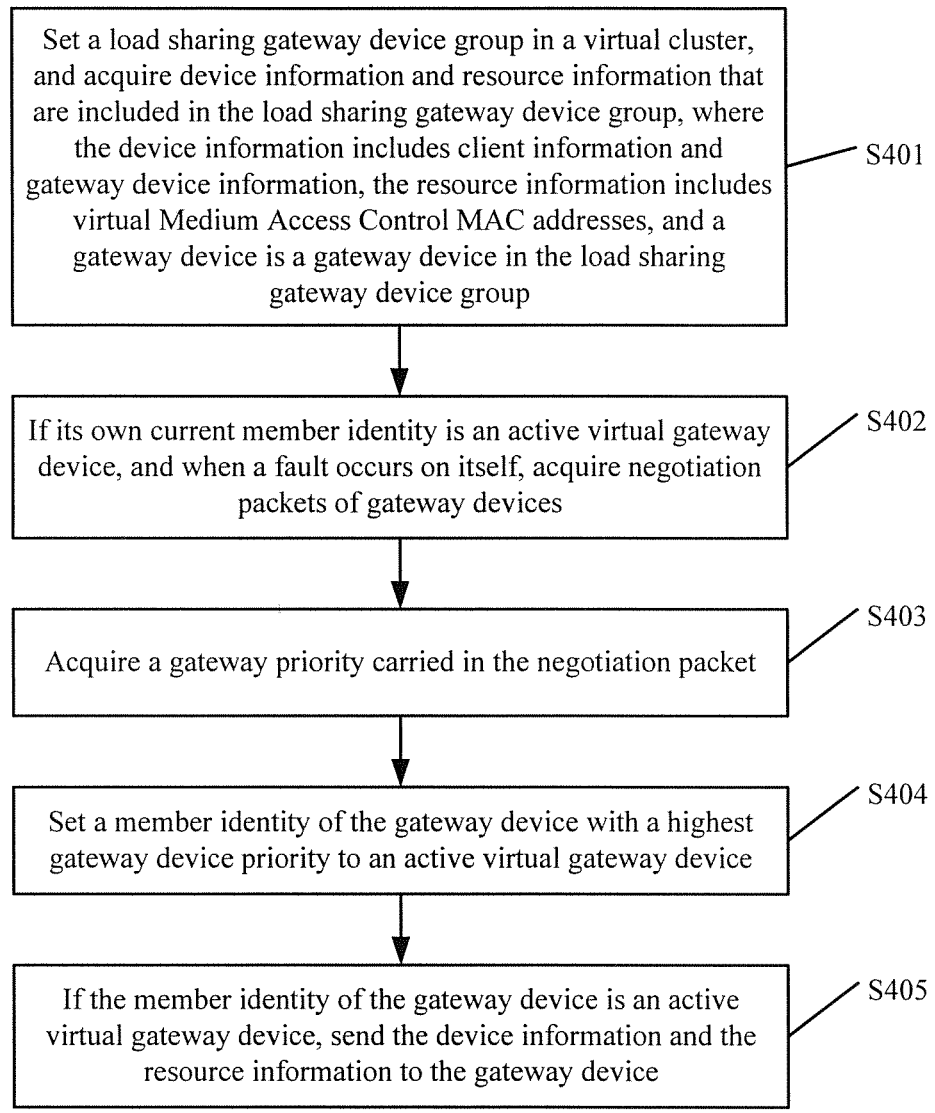
FIG. 4 is a schematic flowchart of yet another method for setting a gateway device identity according to an embodiment of the present application.

Referring to FIG. 4, FIG. 4 is a schematic flowchart of yet another method for setting a gateway device identity according to an embodiment of the present application. As shown in FIG. 4, the method in this embodiment of the present application may be applied to a scenario in which a management gateway device with a member identity being an active virtual gateway device in a virtual sharing gateway group encounters a fault, and the method includes:

S401: Set a load sharing gateway device group in a virtual cluster, and acquire device information and resource information that are included in the load sharing gateway device group, where the device information includes client information and gateway device information, the resource information includes virtual MAC addresses, and a gateway device is a gateway device in the load sharing gateway device group.

Specifically, when the management gateway device sets the load sharing gateway device group in the virtual cluster, the management gateway device serves as an active virtual gateway device of the load sharing gateway device group, sets a unique identifier for the load sharing gateway device group, and acquires the device information and the resource information that are included in the load sharing gateway device group, where the device information includes the client information and gateway device information of the load sharing gateway device group, and the resource information includes multiple virtual MAC addresses of the load sharing gateway device group.

If a gateway device with a member identity being an active virtual forwarding device already exists in the load sharing gateway device group, when the management gateway device encounters a fault, the management gateway device requests a negotiation packet from the gateway device with the member identity being an active virtual forwarding device.

S402: If its own current member identity is an active virtual gateway device, and when a fault occurs on itself, acquire negotiation packets of gateway devices.

Specifically, when the management gateway device encounters a fault, the management gateway device acquires negotiation packets of gateway devices with a member identity being an active virtual forwarding device in the load sharing gateway device group.

The negotiation packet includes a gateway device priority of the gateway device, where the gateway device priority may be a priority parameter that is set by a user according to a performance index of the gateway device.

S403: Acquire a gateway device priority carried in the negotiation packet.

Specifically, the management gateway device acquires, from the negotiation packet, the gateway device priority of the gateway device with the member identity being an active virtual forwarding device in the load sharing gateway device group.

S404: Set a member identity of a gateway device with a highest gateway device priority to an active virtual gateway device.

Specifically, the management gateway device sets, by using the acquired gateway device priority of the gateway device with the member identity being an active virtual forwarding device in the load sharing gateway device group, the member identity of the gateway device with the highest gateway device priority to an active virtual gateway device.

S405: If the member identity of the gateway device is an active virtual gateway device, send the device information and the resource information to the gateway device, so that the gateway device allocates a virtual MAC address to at least one client according to the device information and the resource information, and finally the client searches, according to the virtual MAC address, for a corresponding gateway device to serve as a service gateway.

Specifically, when the management gateway device sets the member identity of the gateway device with the highest gateway device priority to an active virtual gateway device in the load sharing gateway device group, the management gateway device sends the device information and the resource information to the gateway device, and in this case, the gateway device becomes a management gateway device.

After the gateway device becomes the management gateway device, the gateway device allocates a virtual MAC address to at least one client according to the device information and the resource information, where the at least one client is a client belonging to the original management gateway device, the gateway device delivers its own virtual MAC address to a client group by using a VRRP packet, so that a client that has the virtual MAC address in the client group finds the gateway device to serve as a service gateway.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a load sharing gateway device group is set under an architecture of a virtual cluster, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances flexibility of fault processing; in addition, the gateway device delivers its own virtual MAC address, so as to provide the virtual MAC address for a client to select a corresponding gateway device to serve as a service gateway, which implements separation between a function of setting a member identity and a function of delivering a virtual MAC address, and enhances the processing efficiency of a service mechanism, so that a process of implementing traffic load sharing of multiple gateway devices is more intelligent.

Figure 5:
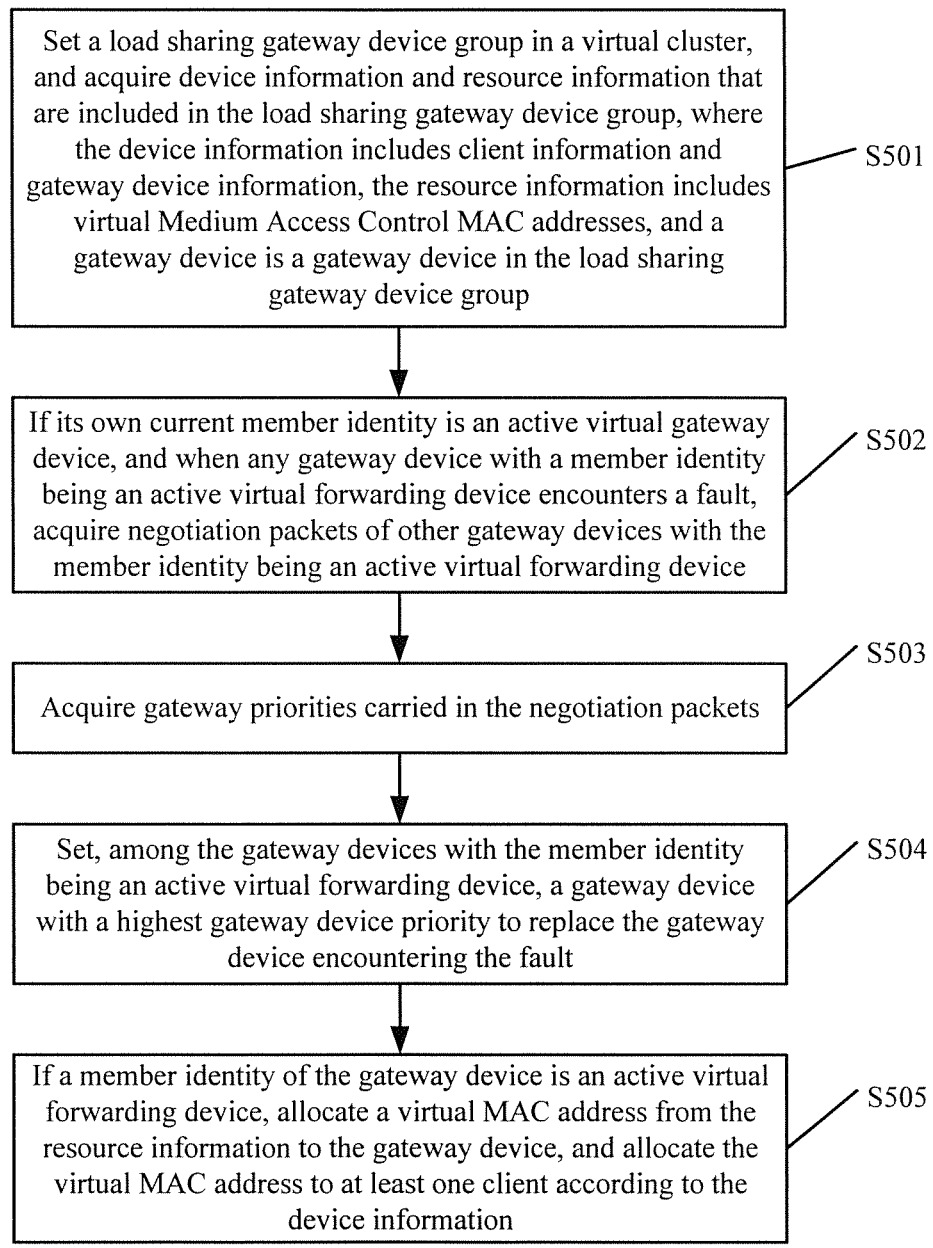
FIG. 5 is a schematic flowchart of still yet another method for setting a gateway device identity according to an embodiment of the present application.

Referring to FIG. 5, FIG. 5 is a schematic flowchart of still yet another method for setting a gateway device identity according to an embodiment of the present application. As shown in FIG. 5, the method in this embodiment of the present application is specifically applied to a scenario in which a management gateway device serves as an active virtual gateway device in a virtual sharing gateway group, and any gateway device with a member identity being an active virtual forwarding device in the virtual sharing gateway group encounters a fault. The method includes:

S501: Set a load sharing gateway device group in a virtual cluster, and acquire device information and resource information that are included in the load sharing gateway device group, where the device information includes client information and gateway device information, the resource information includes virtual MAC addresses, and a gateway device is a gateway device in the load sharing gateway device group.

Specifically, when the management gateway device sets the load sharing gateway device group in the virtual cluster, the management gateway device serves as an active virtual gateway device of the load sharing gateway device group, sets a unique identifier for the load sharing gateway device group, and acquires the device information and the resource information that are included in the load sharing gateway device group, where the device information includes the client information and the gateway device information of the load sharing gateway device group, the resource information includes multiple virtual MAC addresses of the load sharing gateway device group, and the gateway device is a gateway device in the load sharing gateway device group.

If gateway devices with a member identity being an active virtual forwarding device already exist in the load sharing gateway device group, when any gateway device with a member identity being an active virtual forwarding device in the load sharing gateway device group encounters a fault, the management gateway device requests a negotiation packet from another gateway device with a member identity being an active virtual forwarding device.

S502: If its own current member identity is an active virtual gateway device, and when any gateway device with the member identity being an active virtual forwarding device encounters a fault, acquire negotiation packets of other gateway devices with the member identity being an active virtual forwarding device.

Specifically, if any gateway device with the member identity being an active virtual forwarding device in the load sharing gateway device group encounters a fault, the management gateway device acquires negotiation packets of the rest gateway devices with the member identity being an active virtual forwarding device in the load sharing gateway device group.

The negotiation packet includes a gateway device priority of the gateway device, where the gateway device priority may be a priority parameter that is set by a user according to a performance index of the gateway device.

S503: Acquire gateway device priorities carried in the negotiation packets.

Specifically, the management gateway device acquires, from the negotiation packets, the gateway device priorities of the gateway devices with a member identity being an active virtual forwarding device except the gateway device encountering the fault in the load sharing gateway device group.

S504: Set, among the gateway devices with the member identity being an active virtual forwarding device, a gateway device with a highest gateway device priority to replace the gateway device encountering the fault.

Specifically, the management gateway device sets, by using the acquired gateway device priorities of the gateway devices with the member identity being an active virtual forwarding device in the load sharing gateway device group, the gateway device with the highest gateway device priority to replace the gateway device encountering the fault.

The member identity of the gateway device with the highest gateway device priority is still an active virtual forwarding device.

S505: If a member identity of the gateway device is an active virtual forwarding device, allocate a virtual MAC address from the resource information to the gateway device, and allocate the virtual MAC address to at least one client according to the device information, so that the client searches, according to the virtual MAC address, for the gateway device to serve as a service gateway.

Specifically, if the management gateway device sets the member identity of the gateway device to an active virtual forwarding device, and enables the gateway device to replace the gateway device encountering the fault, the management gateway device allocates the virtual MAC address to at least one client according to the device information, where the at least one client is a client belonging to the original gateway device encountering the fault.

The gateway device delivers its own virtual MAC address to a client group by using a VRRP packet, so that a client that has the virtual MAC address in the client group finds the gateway device to serve as a service gateway.

Optionally, a user may further set one gateway device in the virtual cluster to replace the device encountering the fault. The management gateway device sets the gateway device to an active virtual forwarding device, allocates a virtual MAC address from the resource information to the gateway device, and allocates the virtual MAC address to at least one client according to the device information, where the at least one client is a client that belongs to the original gateway device encountering the fault. The gateway device delivers its own virtual MAC address to a client group by using a VRRP packet, so that a client that has the virtual MAC address in the client group finds the gateway device to serve as a service gateway.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a load sharing gateway device group is set under an architecture of a virtual cluster, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances flexibility of fault processing; in addition, the gateway device delivers its own virtual MAC address, so as to provide the virtual MAC address for a client to select a corresponding gateway device to serve as a service gateway, which implements separation between a function of setting a member identity and a function of delivering a virtual MAC address, and enhances the processing efficiency of a service mechanism, so that a process of implementing traffic load sharing of multiple gateway devices is more intelligent.

Figure 6:
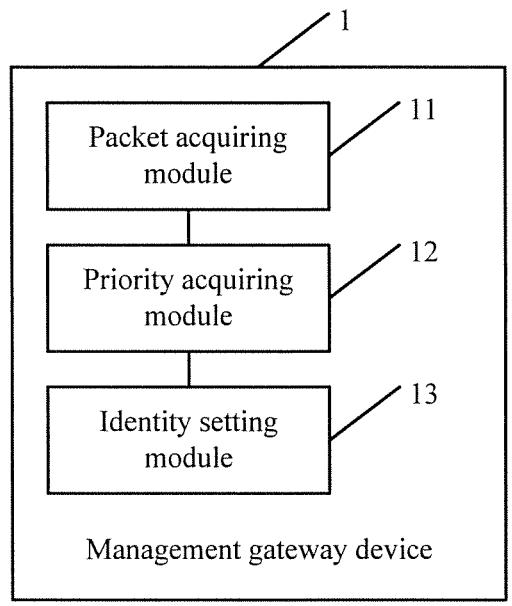
FIG. 6 is a schematic structural diagram of a management gateway device according to an embodiment of the present application.

Referring to FIG. 6, FIG. 6 is a schematic structural diagram of a management gateway device according to an embodiment of the present application. As shown in FIG. 6, a management gateway device 1 in this embodiment of the present application includes a packet acquiring module 11, a priority acquiring module 12, and an identity setting module 13.

The packet acquiring module 11 is configured to acquire a negotiation packet of a gateway device.

In specific implementation, the negotiation packet includes a gateway device priority of the gateway device, where the gateway device priority may be a priority parameter that is set by a user according to a performance index of the gateway device. In the following three cases, the packet acquiring module 11 needs to acquire a negotiation packet of a gateway device:

1. When there is a gateway device, in a virtual cluster, that needs to perform multi-gateway traffic load sharing with the management gateway device 1, the packet acquiring module 11 acquires a negotiation packet of the gateway device.

2. When the management gateway device 1 encounters a fault, the packet acquiring module 11 acquires negotiation packets of gateway devices with a member identity being an active virtual forwarding device among multiple gateway devices of multi-gateway traffic load sharing.

3. When any gateway device with a member identity being an active virtual forwarding device among the multiple gateway devices of multi-gateway traffic load sharing encounters a fault, the packet acquiring module 11 acquires negotiation packets of other gateway devices with a member identity being an active virtual forwarding device.

It should be noted that, when there is a gateway device, in the virtual cluster, that needs to perform multi-gateway traffic load sharing with the management gateway device 1, the gateway device sends a negotiation packet to the management gateway device 1, so as to request to join the load sharing gateway device group.

If a gateway device with a member identity being an active virtual forwarding device already exists in the gateway devices of multi-gateway traffic load sharing, when the management gateway device 1 encounters a fault, the management gateway device requests a negotiation packet from the gateway device with the member identity being an active virtual forwarding device.

If gateway devices with a member identity being an active virtual forwarding device already exist in the gateway devices of multi-gateway traffic load sharing, when any gateway device with a member identity being an active virtual forwarding device among the multiple gateway devices of multi-gateway traffic load sharing encounters a fault, the management gateway device 1 requests a negotiation packet from another gateway device with a member identity being an active virtual forwarding device.

The priority acquiring module 12 is configured to acquire a gateway device priority carried in the negotiation packet.

In specific implementation, the priority acquiring module 12 acquires the gateway device priority of the gateway device from the negotiation packet.

The identity setting module 13 is configured to set a member identity of the gateway device according to the gateway device priority.

In specific implementation, the member identity includes an active virtual gateway device and an active virtual forwarding device, the identity setting module 13 sets the member identity of the gateway device according to the gateway device priority in the negotiation packet that is of the gateway device and acquired by the priority acquiring module 12, and a specific setting manner may be as follows:

1. When there is a gateway device, in the virtual cluster, that needs to perform multi-gateway traffic load sharing with the management gateway device 1, if a gateway device priority that is of the gateway device and acquired by the priority acquiring module 12 is less than a gateway device priority of the management gateway device 1, the identity setting module 13 sets a member identity of the gateway device to an active virtual forwarding device; and if the gateway device priority that is of the gateway device and acquired by the priority acquiring module 12 is greater than the gateway device priority of the management gateway device 1, the identity setting module 13 sets the member identity of the gateway device to an active virtual gateway device.

It should be noted that, if the gateway device priority of the management gateway device 1 is the same as the gateway device priority of the gateway device, optionally, values of system MAC addresses are compared: if a system MAC address of the management gateway device 1 is greater than a system MAC address of the gateway device, the identity setting module 13 sets the member identity of the gateway device to an active virtual forwarding device; and if the system MAC address of the management gateway device 1 is less than the system MAC address of the gateway device, the identity setting module 13 sets the member identity of the gateway device to an active virtual gateway device.

2. If gateway devices with a member identity being an active virtual forwarding device already exist in the gateway devices of multi-gateway traffic load sharing, when the management gateway device 1 encounters a fault, the identity setting module 13 sets a member identity of a gateway device with a highest gateway device priority to an active virtual gateway device according to gateway device priorities that are of all gateway devices in the gateway devices of multi-gateway traffic load sharing and acquired by the priority acquiring module 12.

3. If gateway devices with a member identity being an active virtual forwarding device already exist in the gateway devices of multi-gateway traffic load sharing, when any gateway device with a member identity being an active virtual forwarding device among the multiple gateway devices of multi-gateway traffic load sharing encounters a fault, the identity setting module 13 sets, according to gateway device priorities that are of the rest gateway devices with a member identity being an active virtual forwarding device in the gateway devices of multi-gateway traffic load sharing and acquired by the priority acquiring module 12, a gateway device with a highest gateway device priority to replace the gateway device encountering the fault, and in this case, a member identity of the gateway device with the highest gateway device priority is still an active virtual forwarding device.

The user may further set one gateway device in the virtual cluster to replace the gateway device encountering the fault, and the identity setting module 13 sets the gateway device, which is set by the user in the virtual cluster, to an active virtual forwarding device.

According to the foregoing three cases, the management gateway device 1 sends the member identity of the gateway device to the gateway device by using a VRRP (Virtual Router Redundancy Protocol) packet.

In this embodiment of the present application, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances the processing efficiency of a service mechanism, so that a process of implementing traffic load sharing of multiple gateway devices is more intelligent.

Figure 7:
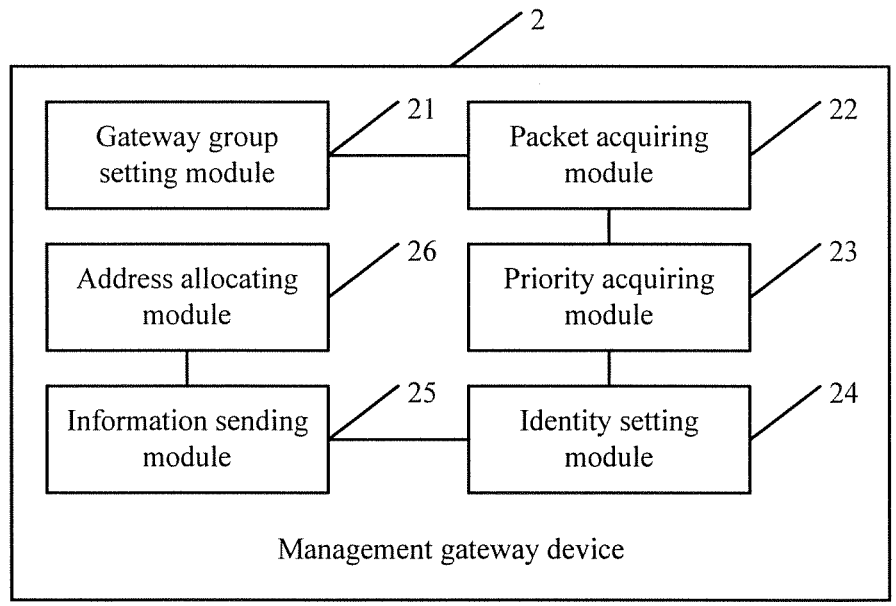
FIG. 7 is a schematic structural diagram of another management gateway device according to an embodiment of the present application.

Referring to FIG. 7, FIG. 7 is a schematic structural diagram of another management gateway device according to an embodiment of the present application. As shown in FIG. 7, a management gateway device 2 in this embodiment of the present application includes a gateway group setting module 21, a packet acquiring module 22, a priority acquiring module 23, an identity setting module 24, an information sending module 25, and an address allocating module 26.

The gateway group setting module 21 is configured to set a load sharing gateway device group in a virtual cluster, and acquire device information and resource information that are included in the load sharing gateway device group, where the device information includes client information and gateway device information, the resource information includes virtual MAC addresses, and the gateway device is a gateway device in the load sharing gateway device group.

In specific implementation, when the gateway group setting module 21 sets the load sharing gateway device group in the virtual cluster, the management gateway device 2 serves as an active virtual gateway device of the load sharing gateway device group, the gateway group setting module 21 sets a unique identifier for the load sharing gateway device group, and acquires the device information and the resource information that are included in the load sharing gateway device group, where the device information includes the client information and gateway device information of the load sharing gateway device group, and the resource information includes multiple virtual MAC addresses of the load sharing gateway device group.

It should be noted that a user may set the identifier for some gateway devices in the virtual cluster, and the gateway devices may find the load sharing gateway device group by using the identifier, and send a negotiation packet to the management gateway device 2 in the load sharing gateway device group, so as to request to join the load sharing gateway device group.

If a gateway device with a member identity being an active virtual forwarding device already exists in the load sharing gateway device group, when the management gateway device 2 encounters a fault, the management gateway device 2 requests a negotiation packet from the gateway device with the member identity being an active virtual forwarding device.

If gateway devices with a member identity being an active virtual forwarding device already exist in the load sharing gateway device group, when any gateway device with a member identity being an active virtual forwarding device in the load sharing gateway device group encounters a fault, the management gateway device 2 requests a negotiation packet from another gateway device with a member identity being an active virtual forwarding device.

Both the management gateway device and the gateway device are gateway devices in the load sharing gateway device group.

The packet acquiring module 22 is configured to acquire a negotiation packet of a gateway device.

In specific implementation, the negotiation packet includes a gateway device priority of the gateway device, where the gateway device priority may be a priority parameter that is set by the user according to a performance index of the gateway device, and the packet acquiring module 22 acquires the negotiation packet of the gateway device.

This embodiment of the present application may be applied to a scenario in which control and forwarding are separated. A controller allocates a virtual MAC address from the resource information to a gateway device to guide forwarding, and allocates the virtual MAC address to at least one client according to the device information, thereby implementing separation between control and forwarding.

Figure 8:
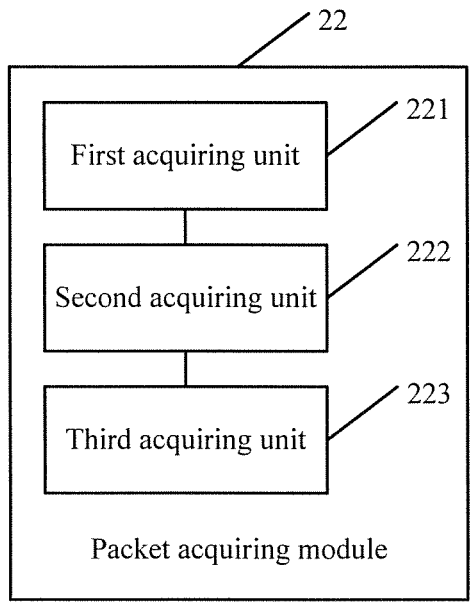
FIG. 8 is a schematic structural diagram of a packet acquiring module according to an embodiment of the present application.

Specifically, referring to FIG. 8 concurrently, FIG. 8 is a schematic structural diagram of a packet acquiring module provided by this embodiment of the present application. As shown in FIG. 8, the packet acquiring module 22 includes a first acquiring unit 221, a second acquiring unit 222, and a third acquiring unit 223.

The first acquiring unit 221 is configured to: if it is detected that a gateway device joins the load sharing gateway device group, acquire a negotiation packet of the gateway device that joins the load sharing gateway device group.

In specific implementation, if the management gateway device 2 detects that there is a gateway device, in a virtual cluster, that joins the load sharing gateway device group to perform multi-gateway traffic load sharing, the first acquiring unit 221 acquires the negotiation packet of the gateway device.

The second acquiring unit 222 is configured to acquire the negotiation packet of the gateway device if its own current member identity is an active virtual gateway device and when a fault occurs on itself.

In specific implementation, when the management gateway device 2 encounters a fault, the second acquiring unit 222 acquires a negotiation packet of a gateway device with a member identity being an active virtual forwarding device in the load sharing gateway device group.

The third acquiring unit 223 is configured to: if its own current member identity is an active virtual gateway device, and when any gateway device with the member identity being an active virtual forwarding device encounters a fault, acquire negotiation packets of other gateway devices with the member identity being an active virtual forwarding device.

In specific implementation, if any gateway device with the member identity being an active virtual forwarding device in the load sharing gateway device group encounters a fault, the third acquiring unit 223 acquires negotiation packets of the rest gateway devices with the member identity being an active virtual forwarding device in the load sharing gateway device group.

The priority acquiring module 23 is configured to acquire a gateway device priority carried in the negotiation packet.

In specific implementation, the priority acquiring module 23 acquires the gateway device priority of the gateway device from the negotiation packet.

The identity setting module 24 is configured to set a member identity of the gateway device according to the gateway device priority.

In specific implementation, the member identity includes an active virtual gateway device and an active virtual forwarding device, and the identity setting module 24 sets the member identity of the gateway device according to the gateway device priority that is in the gateway device negotiation packet and acquired by the priority acquiring module 23, and sends the member identity of the gateway device to the gateway device by using a VRRP packet.

This embodiment of the present application may be applied to a scenario in which control and forwarding are separated. A controller allocates a virtual MAC address from the resource information to a gateway device to guide forwarding, and allocates the virtual MAC address to at least one client according to the device information, thereby implementing separation between control and forwarding.

Figure 9:
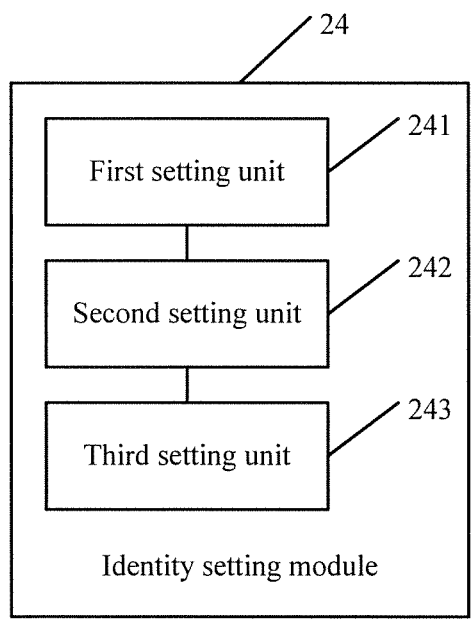
FIG. 9 is a schematic structural diagram of an identity setting module according to an embodiment of the present application.

Specifically, referring to FIG. 9 concurrently, FIG. 9 is a schematic structural diagram of an identity setting module provided by this embodiment of the present application. As shown in FIG. 9, the identity setting module 24 includes a first setting unit 241, a second setting unit 242, and a third setting unit 243.

The first setting unit 241 is configured to set the member identity of the gateway device to an active virtual forwarding device if the gateway device priority of the gateway device is less than its own gateway device priority; and the first setting unit 241 is further configured to set the member identity of the gateway device to an active virtual gateway device if the gateway device priority of the gateway device is greater than its own gateway device priority.

In specific implementation, if the gateway device priority of the gateway device that joins the load sharing gateway device group is less than the gateway device priority of the management gateway device 2, the first setting unit 241 sets the member identity of the gateway device to an active virtual forwarding device; and if the gateway device priority of the gateway device that joins the load sharing gateway device group is greater than the gateway device priority of the management gateway device 2, the first setting unit 241 sets the member identity of the gateway device to an active virtual gateway device.

Optionally, if the gateway device priority of the gateway device that joins the load sharing gateway device group is the same as the gateway device priority of the management gateway device 2, and a system MAC address of the management gateway device 2 is greater than a system MAC address of the gateway device that joins the load sharing gateway device group, the first setting unit 241 sets the member identity of the gateway device to an active virtual gateway device; and if the gateway device priority of the gateway device that joins the load sharing gateway device group is the same as the gateway device priority of the management gateway device 2, and the system MAC address of the management gateway device 2 is less than the system MAC address of the gateway device that joins the load sharing gateway device group, the first setting unit 241 sets the member identity of the gateway device to an active virtual forwarding device.

The second setting unit 242 is configured to set a member identity of a gateway device with a highest gateway device priority to an active virtual gateway device.

In specific implementation, the second setting unit 242 sets the member identity of the gateway device with the highest gateway device priority in the negotiation packets to an active virtual gateway device according to the negotiation packet that is of the gateway device with the member identity being an active virtual forwarding device in the load sharing gateway device group and acquired by the second acquiring unit 222.

The third setting unit 243 is configured to set, among the gateway devices with the member identity being an active virtual forwarding device, a gateway device with a highest gateway device priority to replace the gateway device encountering the fault.

In specific implementation, the third setting unit 243 sets, according to the negotiation packets that are of the rest gateway devices with the member identity being an active virtual forwarding device in the load sharing gateway device group and acquired by the third acquiring unit 223, the gateway device with a highest gateway device priority in the negotiation packets to replace the gateway device encountering the fault.

The member identity of the gateway device with the highest gateway device priority is still an active virtual forwarding device.

Optionally, the user may further set one gateway device in the virtual cluster to replace the device encountering the fault, and the third setting unit 243 sets the gateway device to an active virtual forwarding device.

The information sending module 25 is configured to: if the member identity of the gateway device is an active virtual gateway device, send the device information and the resource information to the gateway device, so that the gateway device allocates a virtual MAC address to at least one client according to the device information and the resource information, and finally the client searches, according to the virtual MAC address, for a corresponding gateway device to serve as a service gateway.

In specific implementation, if the first setting unit 241 sets the member identity of the gateway device to an active virtual gateway device, the information sending module 25 sends the device information and resource information of the load sharing gateway device group to the gateway device, and in this case, the gateway device becomes a management gateway device. The gateway device allocates a virtual MAC address to at least one client according to the device information and the resource information, and delivers its own virtual MAC address to a client group by using a VRRP packet, so that a client that has the virtual MAC address in the client group finds the gateway device to serve as a service gateway.

If the second setting unit 242 sets the member identity of the gateway device with the highest gateway device priority to an active virtual gateway device in the load sharing gateway device group, the information sending module 25 sends the device information and the resource information to the gateway device, and in this case, the gateway device becomes a management gateway device. The gateway device allocates a virtual MAC address to at least one client according to the device information and the resource information, where the at least one client is a client belonging to the original management gateway device 2, the gateway device delivers its own virtual MAC address to a client group by using a VRRP packet, so that a client that has the virtual MAC address in the client group finds the gateway device to serve as a service gateway.

The address allocating module 26 is configured to: if the member identity of the gateway device is an active virtual forwarding device, allocate a virtual MAC address from the resource information to the gateway device, and allocate the virtual MAC address to at least one client according to the device information, so that the client searches, according to the virtual MAC address, for the gateway device to serve as a service gateway.

In specific implementation, if the first setting unit 241 sets the member identity of the gateway device to an active virtual forwarding device, the address allocating module 26 allocates one virtual MAC address from the resource information in the load sharing gateway device group to the gateway device, and allocates the virtual MAC address to at least one client according to the device information. The gateway device delivers its own virtual MAC address to a client group by using a VRRP packet, so that a client that has the virtual MAC address in the client group finds the gateway device to serve as a service gateway.

If the third setting unit 243 sets the member identity of the gateway device to an active virtual forwarding device, and enables the gateway device to replace the gateway device encountering the fault, the address allocating module 26 allocates the virtual MAC address to at least one client according to the device information, where the at least one client is a client belonging to the original gateway device encountering the fault. The gateway device delivers its own virtual MAC address to a client group by using a VRRP packet, so that a client that has the virtual MAC address in the client group finds the gateway device to serve as a service gateway.

Optionally, the user may further set one gateway device in the virtual cluster to replace the device encountering the fault. The third setting unit 243 sets the gateway device to an active virtual forwarding device, and the address allocating module 26 allocates a virtual MAC address to the gateway device from the resource information, and allocates the virtual MAC address to at least one client according to the device information, where the at least one client is a client originally belonging to the gateway device encountering the fault. The gateway device delivers its own virtual MAC address to a client group by using a VRRP packet, so that a client that has the virtual MAC address in the client group finds the gateway device to serve as a service gateway.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a load sharing gateway device group is set under an architecture of a virtual cluster, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances flexibility of fault processing; in addition, the gateway device delivers its own virtual MAC address, so as to provide the virtual MAC address for a client to select a corresponding gateway device to serve as a service gateway, which implements separation between a function of setting a member identity and a function of delivering a virtual MAC address, and enhances the processing efficiency of a service mechanism, so that a process of implementing traffic load sharing of multiple gateway devices is more intelligent.

Figure 10:
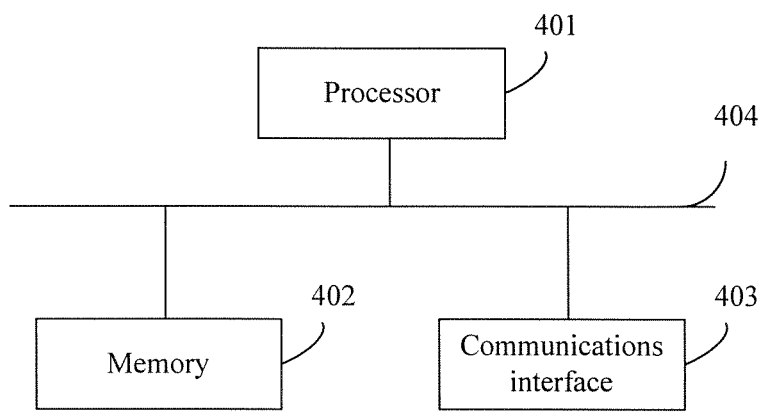
FIG. 10 is a schematic structural diagram of a computer system-based management gateway device according to an embodiment of the present application.

The management gateway device in the embodiments of the present application may be implemented based on a computer system, and all the methods shown in FIG. 1 to FIG. 5 may be implemented in a computer system-based management gateway device. FIG. 10 shows an embodiment of a computer system-based management gateway device. The management gateway device in this embodiment may include: a processor 401, a memory 402, and a communications interface 403. The memory 402 is configured to store program code. The processor 401 is configured to execute the program code stored in the memory 402. In this embodiment of the present application, the memory 402 stores first program code, and the processor 401 is configured to execute the first program code, including executing the following operations: acquiring a negotiation packet of a gateway device; acquiring a gateway device priority carried in the negotiation packet; and setting a member identity of the gateway device according to the gateway device priority. The communications interface 403 is configured to communicate with an external device, for example, communicate with a user terminal. All messages (as shown in FIG. 1 to FIG. 5 of method embodiments) exchanged between a service control device and a user terminal are sent and received by using the communications interface 403. The processor 401 processes, according to the program code in the memory 402, a message received by the communications interface 403, and exchanges with the external device by using the communications interface 403. The processor 401 may be a central processing unit (CPU), an application-specific integrated circuit (ASIC), or the like. The management gateway device in this embodiment may include a bus 404. The processor 401, the memory 402, and the communications interface 403 may be connected and communicate with each other by using the bus 404. The memory 402 may include an entity having a storage function, such as a random access memory (RAM), a read-only memory (ROM), and a disk. A calling context in this embodiment of the present application may be temporarily stored in the RAM.

This embodiment of the present application may be applied to a scenario in which control and forwarding are separated. A controller allocates a virtual MAC address from resource information to a gateway device to guide forwarding, and allocates the virtual MAC address to at least one client according to device information, thereby implementing separation between control and forwarding.

In this embodiment of the present application, a member identity of a gateway device is set to an active virtual gateway device or an active virtual forwarding device by using gateway device priorities that are preset for multiple gateway devices by a user, and a process of negotiation by running a protocol is not needed, which reduces complexity of a selection process, and enhances the processing efficiency of a service mechanism, so that a process of implementing traffic load sharing of multiple gateway devices is more intelligent.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may become a computer-readable medium when appropriate. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely exemplary embodiments of the present application, and certainly is not intended to limit the protection scope of the present application. Therefore, equivalent variations made in accordance with the claims of the present application shall fall within the scope of the present application.

What is claimed is:

1. A method for setting a member identity of a gateway device, the method comprising:
    setting, by a management gateway device, a load sharing gateway device group, wherein the management gateway device has a member identity that indicates that it is an active virtual gateway device within the load sharing gateway device group, and acquiring, by the management gateway device, device information and resource information that are comprised in the load sharing gateway device group, wherein a gateway device in the load sharing gateway device group serves a client in a client group as a gateway, wherein the device information comprises client information and gateway device information, wherein the resource information comprises multiple virtual Medium Access Control (MAC) addresses of the load sharing gateway device group, the client information and the gateway device information for allocating a virtual MAC address to the client, and wherein the virtual MAC address belongs to the multiple virtual MAC addresses;
    acquiring, by the management gateway device, a negotiation packet of the gateway device that is sent by the gateway device, wherein the negotiation packet comprises a gateway device priority of the gateway device;
    acquiring, by the management gateway device, the gateway device priority carried in the negotiation packet;
    setting, by the management gateway device, the member identity of the gateway device according to the gateway device priority;
    wherein acquiring, by the management gateway device, the negotiation packet of the gateway device that is sent by the gateway device comprises:
        upon the management gateway device detecting that the gateway device joins the load sharing gateway device group, acquiring, by the management gateway device, the negotiation packet of the gateway device that joins the load sharing gateway device group; and
    wherein setting, by the management gateway device, the member identity of the gateway device according to the gateway device priority comprises:
        when the gateway device priority of the gateway device is less than a gateway device priority of the management gateway device, setting, by the management gateway device, the member identity of the gateway device as an active virtual forwarding device, and
        when the gateway device priority of the gateway device is greater than the gateway device priority of the management gateway device, setting, by the management gateway device, the member identity of the gateway device as an active virtual gateway device and sending, by the management gateway device, the device information and the resource information to the gateway device.

2. The method according to claim 1 wherein:
acquiring, by the management gateway device, a negotiation packet of the gateway device that is sent by the gateway device comprises:
    when a current member identity of the management gateway device is an active virtual gateway device, and when a fault occurs on the management gateway device, acquiring, by the management gateway device, the negotiation packet of the gateway device; and
setting, by the management gateway device, the member identity of the gateway device according to the gateway device priority comprises:
    setting, by the management gateway device, a member identity of a gateway device with a highest gateway device priority to an active virtual gateway device.

3. The method according to claim 1, wherein:
acquiring, by the management gateway device, a negotiation packet of the gateway device that is sent by the gateway device comprises:
    when a current member identity of a management gateway device is an active virtual gateway device, and when any gateway device with a member identity being an active virtual forwarding device encounters a fault, acquiring, by the management gateway device, negotiation packets of other gateway devices with the member identity being an active virtual forwarding device; and
setting, by the management gateway device, the member identity of the gateway device according to the gateway device priority comprises:
    setting, by the management gateway device, among the gateway devices with the member identity being an active virtual forwarding device, a gateway device with a highest gateway device priority to replace the gateway device encountering the fault.

4. The method according to claim 1, further comprising:
when the member identity of the gateway device is an active virtual forwarding device, allocating, by the management gateway device, a virtual MAC address from the resource information to the gateway device and allocating the virtual MAC address to at least one client according to the device information.

5. A management gateway device, comprising:
a non-transitory memory storing instructions; and
a processor coupled to the non-transitory memory; wherein the instructions, when executed by the processor, cause the management gateway device to be configured to:
    set a load sharing gateway device group, wherein the management gateway device has a member identity that indicates that it is an active virtual gateway device within the load sharing gateway device group, and acquire device information and resource information that are comprised in the load sharing gateway device group, wherein a gateway device in the load sharing gateway device group serves a client in a client group as a gateway, wherein the device information comprises client information and gateway device information, wherein the resource information comprises multiple virtual Medium Access Control (MAC) addresses of the load sharing gateway device group, the client information and the gateway device information for allocating a virtual MAC address to the client, and wherein the virtual MAC address belongs to the multiple virtual MAC addresses, acquire a negotiation packet of the gateway device that is sent by the gateway device, wherein the negotiation packet comprises a gateway device priority of the gateway device, acquire the gateway device priority carried in the negotiation packet, set the member identity of the gateway device according to the gateway device priority, upon the management gateway device detecting that the gateway device joins the load sharing gateway device group, acquire the negotiation packet of the gateway device that joins the load sharing gateway device group, when the gateway device priority of the gateway device is less than a gateway device priority of the management gateway device, set the member identity of the gateway device as an active virtual forwarding device, and when the gateway device priority of the gateway device is greater than the gateway device priority of the management gateway device, set the member identity of the gateway device as an active virtual gateway device and send the device information and the resource information to the gateway device.

6. The management gateway device according to claim 5, wherein the instructions, when executed by the processor, further cause the management gateway device to be configured to:

acquire the negotiation packet of the gateway device and set a member identity of a gateway device with a highest gateway device priority to an active virtual gateway device when a current member identity of the management gateway device is an active virtual gateway device and when a fault occurs on the management gateway device.

7. The management gateway device according to claim 5, wherein the instructions, when executed by the processor, further cause the management gateway device to be configured to:

when a current member identity of the management gateway device is an active virtual gateway device, and when any gateway device with a member identity being an active virtual forwarding device encounters a fault, acquire negotiation packets of other gateway devices with the member identity being an active virtual forwarding device and set, among the gateway devices with the member identity being an active virtual forwarding device, a gateway device with a highest gateway device priority to replace the gateway device encountering the fault.

8. The management gateway device according to claim 5 wherein the instructions, when executed by the processor, further cause the management gateway device to be configured to:

when the member identity of the gateway device is an active virtual forwarding device, allocate a virtual MAC address from the resource information to the gateway device, and allocate the virtual MAC address to at least one client according to the device information.

* * * * *